July 3, 1956
L. J. CIALONI
2,753,438
GREASE GUN LAMP
Filed Sept. 3, 1954
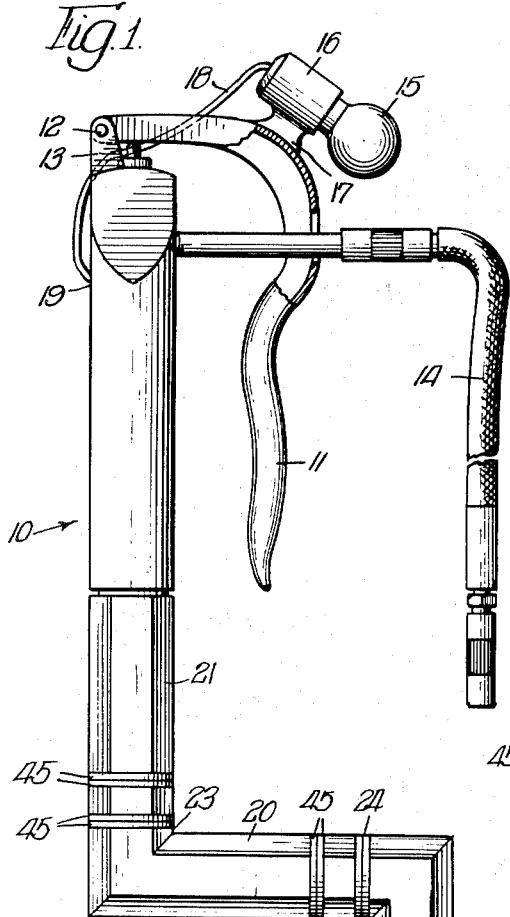
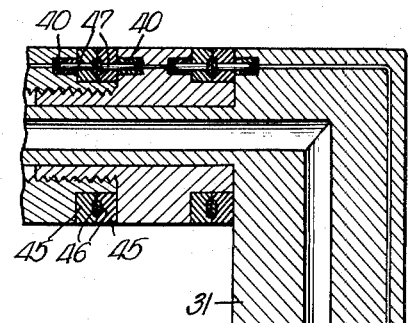
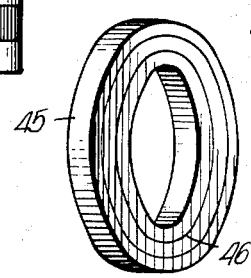
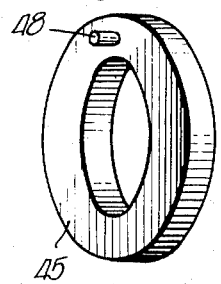
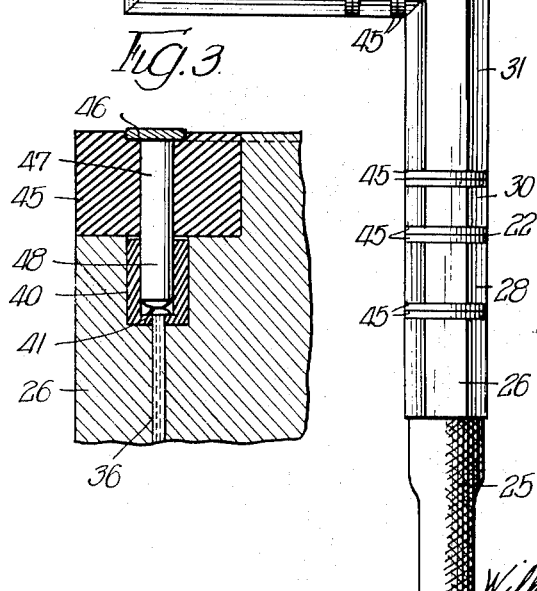
INVENTOR.
Lucian J. Cialoni,
BY
Wilkinson, Huxley, Byron + Hume
Attys.

United States Patent Office 2,753,438
Patented July 3, 1956

2,753,438

GREASE GUN LAMP

Lucian J. Cialoni, Chicago, Ill., assignor to Chicago Mobile Service, Chicago, Ill., a copartnership Application September 3, 1954, Serial No. 453,988

1 Claim. (Cl. 240—2)

This invention relates, as indicated, to grease gun lamps, and more particularly to the electrical conductors for supplying electrical energy, through swivel joints to a lamp.

It is necessary to mount swivel joints between the grease gun and hose to prevent twisting and kinking of the hose while the grease gun is in use. The working area has ordinarily been lighted by a separate lamp. This is inconvenient, since, if the light is to be effective, it should be moved to each greasing position. This increases the time and inconveniences the worker. In the past where the lamps have been attached to grease guns, they have had separate cords subject to kinking and twisting, making the attachment of lamps to the guns prohibitive.

It is, therefore, an object of this invention to provide a lamp for grease guns which does not have a cord which will twist and kink.

It is a further object of this invention to provide electrical connections for a lamp in a multiple swivel.

It is a further object of this invention to provide electrical conductors for a grease gun mounted in a multiple swivel, which will not be subject to kinking and twisting when in use.

It is yet another object of this invention to provide a grease gun lamp assembly which is simply and easily manufactured.

Further objects of this invention will become apparent as the description proceeds.

In the drawings:

Figure 1 is a fragmentary elevational view, partly in section, of the grease gun, multiple swivel, and lamp, embodying the invention.

Figure 2 is a fragmentary enlarged cross sectional view of the hose and some of the fittings in the multiple swivel, showing the washers and contact rings for supplying electrical energy through the multiple swivel.

Figure 3 is a fragmentary enlarged view of a fitting showing in section a washer, contact ring, prong, and socket in a fitting.

Figure 4 is an enlarged perspective view showing one face of a washer having a contact ring.

Figure 5 is a perspective view of the other face of the washer shown in Figure 4, showing the prong projecting from the face.

Numeral 10 represents, generally, a typical grease gun which is used for lubricating automobiles, trucks and the like. It is provided with a handle 11, for operation, pivotally mounted at 12 on bracket 13. The grease gun 10 may be provided with an extension 14.

Grease gun 10 has mounted thereon a lamp 15 removably received in a socket 16. Socket 16 is mounted by a bracket 17 on handle 11. Electrical energy is supplied to socket 16 and lamp 15 by a cord 18 which enters conduit 19 in a fitting 21 of the multiple swivel, such fitting 21 being non-rotatable with respect to the grease gun 10.

The grease gun is mounted on a multiple swivel 20 which provides 360° rotation of the grease gun about both horizontal and vertical axes. As shown in Figure 1, grease gun 10 rotates about vertical axes about swivel joints 22, 23, and about horizontal axes about swivel joint 24. This universal joint permits great freedom of movement of the grease gun without kinking or twisting of the hose.

Multiple swivel 20 is provided with a hose 25 for supplying grease and the like to grease gun 10. Hose 25 engages shoulders provided on fitting 26 of the multiple swivel.

Grease is supplied to the gun 10 from hose 25 through a continuous conduit 27, through multiple swivel 20 (Figure 2).

Referring now to Figure 2, fitting 28 engages fitting 26 by a screw connection 50. Fitting 28 has a boss 29 that extends through an aperture beyond fitting 30. An L-shaped fitting 31 is mounted on fitting 30 by a screw connection 51. Semi-cylindrical jaws 38, 39 are engaged in a groove 52, in boss 29 to prevent the boss from sliding off fitting 30. It will be clear from the foregoing that there is a rotatable joint at 22 between fittings 28 and 30. Fitting 30 is journaled on boss 29 for 360° rotation, and is prevented from slipping or sliding off boss 29 by jaws 38, 39. The swivel joint 22 may be easily disassembled by unscrewing connection 51, thereby removing fitting 31 from fitting 30, and then removing the semi-cylindrical jaws 38, 39, which permits the fitting 30 to slide off boss 29.

It should be understood that the swivel joints 23 and 24 are similar to swivel joint 22. Therefore, description of the invention will be confined to swivel joint 22, since the mechanical and electrical construction of other joints in the multiple swivel will be the same.

As shown in Figure 2, the hose 25 is provided with two electrical conductors 33, 35. Electrical conductor 33 is electrically connected, as by welding, soldering, and the like, to fitting 26. Conductor 35 passes from hose 25 through fitting 26 to a socket 40 of the type more clearly shown in Figure 3. Thus, the conductor 33 is grounded to the fittings of the multiple swivel, and conductor 35 is insulated from the fittings in the multiple swivel. All the fittings in the multiple swivel are of metal or other electrically conducting material, and a ground connection of conductor 33 to fitting 26 also serves as a ground connection for the lamp socket 16 mounted on a metal bracket 17 to metallic handle 11. Conductor 35 is connected to socket 40 and associated pair of washers 45 and contact rings 46. Another conductor 36 is connected between sockets 40 in fitting 28.

As more clearly shown at joint 22 in Figure 2, the electrical connection between the swivel joints is provided by a pair of washers 45, of insulating or non-conducting material, having opposite, electrically conductive metal contact rings 46. The contact rings of each pair of washers are in electrical engagement, so that the rings may slide relative to each other and yet maintain an electrical connection between the fittings. Each of the metal contact rings is electrically connected to a prong 47. Prong 47 has an extension 48 which projects, as shown in Figure 5, from the face of the washer 45 opposite the metal contact ring 46, for reception in socket 40. As shown in Figure 3, the projection 48 is received in a socket of non-insulating material 40 and electrically engages an electrical contact 41 connected to conductor 36.

The operation of the lamp on the grease gun should be apparent from the foregoing. The electricity is supplied to the socket 16 of the lamp by a ground connection of conductor 33 through the fittings of the multiple swivel. The electrical conductors 35, 36 are connected between the sockets 40 in the fittings. Each fitting is provided with a shoulder for mounting thereon a washer 45 of non-conducting material having electrical contact ring 46 facing a similar washer and electrical ring on the adjacent fitting. The contact rings permit 360° rotation of the fittings with respect to each other and still maintain electrical connections between the adjacent fittings through the sliding contact of contact rings 46.

In the drawing and specification, there have been set forth a preferred embodiment of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention as further defined in the following claim.

I claim:

An electric system for lighting grease guns mounted on a multiple swivel, which comprises a hose, a multiple swivel of electrical conducting material having a plurality of fittings, said swivel connected at one end to said hose for permitting 360° movement about horizontal and vertical axes without kinking and twisting of said hose, a grease gun connected to the other end of said multiple swivel, a lamp mounted on said grease gun for illuminating the working area, two electrical conductors in said hose, the first of said conductors electrically connected to said multiple swivel for a ground connection for said lamp, the second of said conductors passing through a conduit in said swivel, sockets on said swivels connected to the second of said conductors, a pair of washers of electrical non-conducting material mounted on adjacent shoulders of said fittings, each of said washers having contacting metal rings on one face for transmitting electrical energy, and a prong projecting from the other face, said prong electrically connected to said metal ring and adapted to be received in said socket of said fittings.

References Cited in the file of this patent

UNITED STATES PATENTS

| | | |
|---|---|---|
| 2,038,911 | Stutz et al. | Apr. 28, 1936 |
| 2,240,195 | Reiber | Apr. 29, 1941 |